US006430164B1

United States Patent
Jones et al.

(10) Patent No.: US 6,430,164 B1
(45) Date of Patent: Aug. 6, 2002

(54) COMMUNICATIONS INVOLVING DISPARATE PROTOCOL NETWORK/BUS AND DEVICE SUBSYSTEMS

(75) Inventors: Marc T. Jones, Longmont; Charles W. Spaur, Aurora; Michael A. Tibbetts, Longmont; Patrick J. Kennedy, Boulder, all of CO (US)

(73) Assignee: Cellport Systems, Inc., Boulder, CO (US)

( * ) Notice: Subject to any disclaimer, the term of this patent is extended or adjusted under 35 U.S.C. 154(b) by 0 days.

(21) Appl. No.: 09/430,850

(22) Filed: Nov. 1, 1999

Related U.S. Application Data

(60) Provisional application No. 60/139,820, filed on Jun. 17, 1999.

(51) Int. Cl.[7] .............................. H04Q 7/00; G06F 9/40
(52) U.S. Cl. ...................... 370/313; 370/389; 709/310; 455/99
(58) Field of Search ................................. 370/389, 392, 370/401, 466, 329, 349, 338, 313, 465; 701/29, 33, 36, 213; 713/168, 200, 201; 455/456, 410, 423, 67.1, 72, 99; 709/205, 202, 217, 310, 311, 313, 230, 201

(56) References Cited

U.S. PATENT DOCUMENTS

| | | | |
|---|---|---|---|
| 5,289,378 A | | 2/1994 | Miller et al. ........... 364/424.04 |
| 5,491,693 A | | 2/1996 | Britton et al. ........... 370/85.13 |
| 5,673,322 A | * | 9/1997 | Pepe et al. .................. 370/466 |
| 5,717,737 A | | 2/1998 | Doviak et al. ................. 379/58 |
| 5,732,074 A | * | 3/1998 | Spaur et al. .................. 370/401 |
| 5,732,216 A | * | 3/1998 | Logan et al. ..................... 348/7 |
| 5,778,189 A | | 7/1998 | Kimura et al. ......... 395/200.66 |
| 5,809,415 A | * | 9/1998 | Rossmann .................. 370/352 |
| 5,856,976 A | | 1/1999 | Hirano ........................ 730/401 |
| 6,023,232 A | * | 2/2000 | Eitzenberger ................ 340/988 |
| 6,031,904 A | * | 2/2000 | An et al. ...................... 370/352 |
| 6,076,099 A | * | 6/2000 | Chen et al. .................. 709/202 |
| 6,104,711 A | * | 8/2000 | Voit ............................. 370/352 |

FOREIGN PATENT DOCUMENTS

WO   PCT/US00/16657    6/1999

\* cited by examiner

*Primary Examiner*—Chau Nguyen
*Assistant Examiner*—Andy Lee
(74) *Attorney, Agent, or Firm*—Sheridan Ross P.C.

(57) ABSTRACT

A communications apparatus for enabling communications among networks, buses, devices and other subsystems having different communication requirements is provided. The communications apparatus offers an open architecture for interoperability among diverse subsystems. The communications apparatus is particularly applicable in a vehicle. In one embodiment, a portal apparatus located remote from the vehicle facilitates communications with the communications apparatus, particularly where the vehicle is part of a vehicle fleet. The communications apparatus includes a common module that has at least one protocol by which disparate subsystems can communicate with each other. One or more managers can be defined as being part of the common module. The disparate subsystem managers provide the necessary interfacing to enable the disparate subsystems to communicate between and among each other using the common module. Each such manager has dedicated functionalities to facilitate communications. Managers associated with the common module may include managers for use in configuration and diagnostic tasks, encryption/decryption, compression/de-compression, controlling data flow, security regulation, and selecting an acceptable link for outside communications. The common module also includes a base manager for registering disparate subsystem managers including associating a name with each of them.

30 Claims, 3 Drawing Sheets

COMMUNICATIONS INVOLVING DISPARATE PROTOCOL NETWORK/BUS AND DEVICE SUBSYSTEMS

This application is related to and claims priority from Provisional Patent Application No. 60/139,820 filed Jun. 17, 1999.

FIELD OF THE INVENTION

The present invention relates to enabling communications between or among different operably interconnected devices and, in particular, to providing communications internally and externally of a vehicle, involving disparate subsystems using a common module and appropriate managers.

BACKGROUND OF THE INVENTION

Communications hardware and associated operations in different makes and models of vehicles continue to expand. There are currently, however, no standards or common procedures by which each of a number of disparate hardware devices can be operatively connected together for common purposes. This lack of effective connectivity inhibits desired communications between and among disparate networks, buses, devices and any other subsystems that might be found in a vehicle. This connectivity deficiency also negatively impacts the ability of one or more remote stations to communicate with such nodes in the vehicle.

Information transfers involving a remote station with hardware subsystems located in a vehicle have been enhanced with the availability of the Internet and wireless systems. A computer or other intelligent device located in the vehicle can communicate with one or more remote stations using. the Internet and wireless technology. U.S. Pat. No. 5,732,074 issued Mar. 24, 1998 entitled "Mobile Portable Wireless Communication System", which is assigned to the assignee of the present application, describes a system by which a network in the vehicle including a number of devices associated with the network can send and receive information relative to the Internet.

With respect to multiple vehicle disparate subsystems in a vehicle, it is desirable to further facilitate communications both within and outside the vehicle. This can be effectively accomplished by an open architecture that can be responsible for enabling communications among a plethora of present and potential subsystems for use in a vehicle. Such a communications apparatus must be able to handle different communications requirements and facilitate interconnection of the disparate subsystems.

SUMMARY OF THE INVENTION

In accordance with the present invention, a communications apparatus is provided to enable information and data transfers between or among disparate subsystems. In an exemplary embodiment, the communications apparatus is contained within a vehicle having a number of disparate subsystems. The disparate subsystems include protocol based units and close-ended devices. The protocol based units can include networks and buses having associated components or peripherals that are interconnected. The close-ended devices are referred to herein as devices that do not have International. Standards Organization (ISO) network layering and typically constitute a terminating communication node in the context of data flow ending or originating from such a device, and not typically acting as a link or pass through device for information or data transfers.

An example of such a close-ended device might be a global positioning system (GPS) that is useful in providing vehicle location information or a hardware device, such as a vehicle sensor from which data can be obtained for a particular vehicle component to which the sensor is operably connected In addition to the GPS, disparate subsystems may include an Internet protocol (IP) stack comprised of a number of network layers that are commonly involved in transfers using the Internet, a controller area network (CAN) found in at least some vehicles and which includes a bus along which a number of vehicle elements, communicate for supplying information concerning such elements. The disparate subsystems can also include an intelligent transportation system data bus (IDB) and/or an onboard diagnostics (OBD) that are involved with monitoring and providing information related to vehicle components. Voice recognition (VR) technology and text-to-speech (TTS) technology can also be part of the group of disparate subsystems and which are involved in facilitating speech control and response communications in the vehicle. Other disparate subsystems may include an analog/digital converter (ADC), a standard serial bus, a universal serial bus (USB), a user datagram packet/Internet protocol stack and a cellphone, as well as one or more other customer proprietary devices.

In conjunction with enabling communications between and among the disparate subsystems, as well as communications outside the vehicle, the communications apparatus includes a common module and a number of disparate subsystem managers. The common module is defined as being comprised of a number of common module managers, which may include one or more of the following: a base manager for handling registration and de-registration of disparate subsystem managers, as well as other components or component processees that perform communication tasks; a configuration manager for use in downloading applications, configuring routing tables, reviewing error logs and other assigned tasks; a diagnostics manager for collecting and relaying diagnostic data; a security manager for use in, among other things, monitoring external applications attempting to connect to the communications apparatus for security purposes; a flow manager having the ability, to interconnect children (child processes) of managers in order to perform operations on data passing through them; compression/decompression managers involved with compressing and de-compressing data being communicated; and encryption/de-encryption managers for encrypting/de-encrypting data, as well as user-defined services, that can process, filter or otherwise act on available data.

The disparate subsystem managers can communicate with each other involving the common module functionalities using at least one common protocol. In a preferred embodiment, two communication protocols are available. These are identified as a bus applications programming interface (API) and a stream API. The bus communication is useful in applications in which a number of independent components are involved in the communication, while, stream communication is useful for unstructured stream data between two components.

With respect to the number of disparate subsystem managers, a dedicated one disparate subsystem manager is defined as communicating with a particular disparate subsystem. Accordingly, the number of disparate subsystem managers is equal to at least the number of disparate subsystems. For example, a TCP/IP stack operably communicates with a TCP/IP manager in order to participate in the functionalities and features associated with the communications apparatus. Each disparate subsystem manager provides functions that are common, namely: providing a native interface to the specific disparate subsystem with which it communicates, providing an interface to the common module, and performing a number of management functions. Conversely, because of the dissimilarities among the disparate subsystems, many of the disparate subsystem managers have different software capabilities that are unique to the particular disparate subsystem for which it has responsibility.

With respect to the interoperability among the disparate subsystems and the communications apparatus, an exemplary operation is next described. A request for data or other information might originate from a source or site external to a vehicle having a communications apparatus. This request for information is communicated wirelessly using the Internet and its TCP/IP communication protocol and in which at least the vehicle has an Internet address, although components in the vehicle may also have separate Internet addresses. Wireless technology in the vehicle receives this Internet communication and it is routed or received by the TCP/IP disparate subsystem or protocol stack. The request for information is handled by the TCP/IP manager that is in direct communication with the TCP/IP disparate subsystem. Based on its recognition of the contents of the request for information, such as a configuration packet, the TCP/IP manager creates a first child process for establishing a stream API (application programmer's interface) for transferring the requested information in stream form. In one embodiment, from the contents of the request, fox information, the TCP/IP manager is involved with at least some, if not all, of the request to a second manager that will be involved in obtaining the requested information. By way of example, the second manager might be the GPS manager, where the requested information includes NMEA data from a GPS disparate subsystem. In such a case, the informations related to the request received by the GPS manager is utilized by it to manage or otherwise control the obtaining of data from the GPS subsystem. In that regard, a second child process associated with obtaining the data from the GPS subsystem by a stream API is created. The second child process cooperates with the first child process to transmit the requested information from the GPS subsystem to the requesting source external to the vehicle. As part of creating each child process, the common module also is involved, through its base manager, in the registration of the dynamically created first and second child processes. When the request for information is satisfied, such child processees can be de-registered using the base manager. Utilization of such child processees enables the managers to function with multiple requests that are simultaneously satisfied or have overlapping needs for the same services using the same managers. The child processees may be spawned through the responsibility or management of other managers, such as the flow manager. Additionally, services associated with the obtaining of the data might be employed including compression of the obtained information and encryption thereof, as well as reliance on the security manager to insure that the request for information has authorized access to the communications apparatus.

In one embodiment, data gathering and other communications are facilitated involving a fleet of vehicles, with each having an embedded communications apparatus. Instead of the owner/operator of the vehicle fleet directly accessing each of communications apparatuses in the vehicles of its fleet, a portal apparatus acts as a communications link between vehicle fleets and the fleet managing subsystem. The portal apparatus facilitates downloading of software configurations and updates to each communications apparatus in the vehicles of the particular fleet, as well as facilitating the obtaining of vehicle operational data and other information including diagnostic data and status information including fault-related data.

Based on the foregoing summary, a number of salient aspects of the present invention are readily identified. Transfers of information including data relative to different devices, buses and/or networks are substantially seamlessly achieved. Such transfers can be accomplished among these different subsystems without requiring that they be modified, thereby achieving a "plug and play" result. The disparate subsystems include protocol dependent components as well as close-ended devices at which data flow originates or is terminated, such as a GPS. Consequently, the communications apparatus of the present invention handles communications among devices that are not characterized by ISO network layering. The disparate subsystems communicate with each other using a common communications protocol involving a common module. Communications can occur involving the common module, both externally and internally of a vehicle. Such communication transfers can include: data logging, application program downloading, vehicle component or sensor monitoring and vehicle location information. In one embodiment, management of fleet vehicles is augmented by a portal apparatus located intermediate a number of communications apparatuses embedded in fleet vehicles and fleet management subsystems.

Additional advantages of the present invention will become readily apparent from the following discussion, particularly when taken together with the accompanying drawings

DETAILED DESCRIPTION

Figure 1:
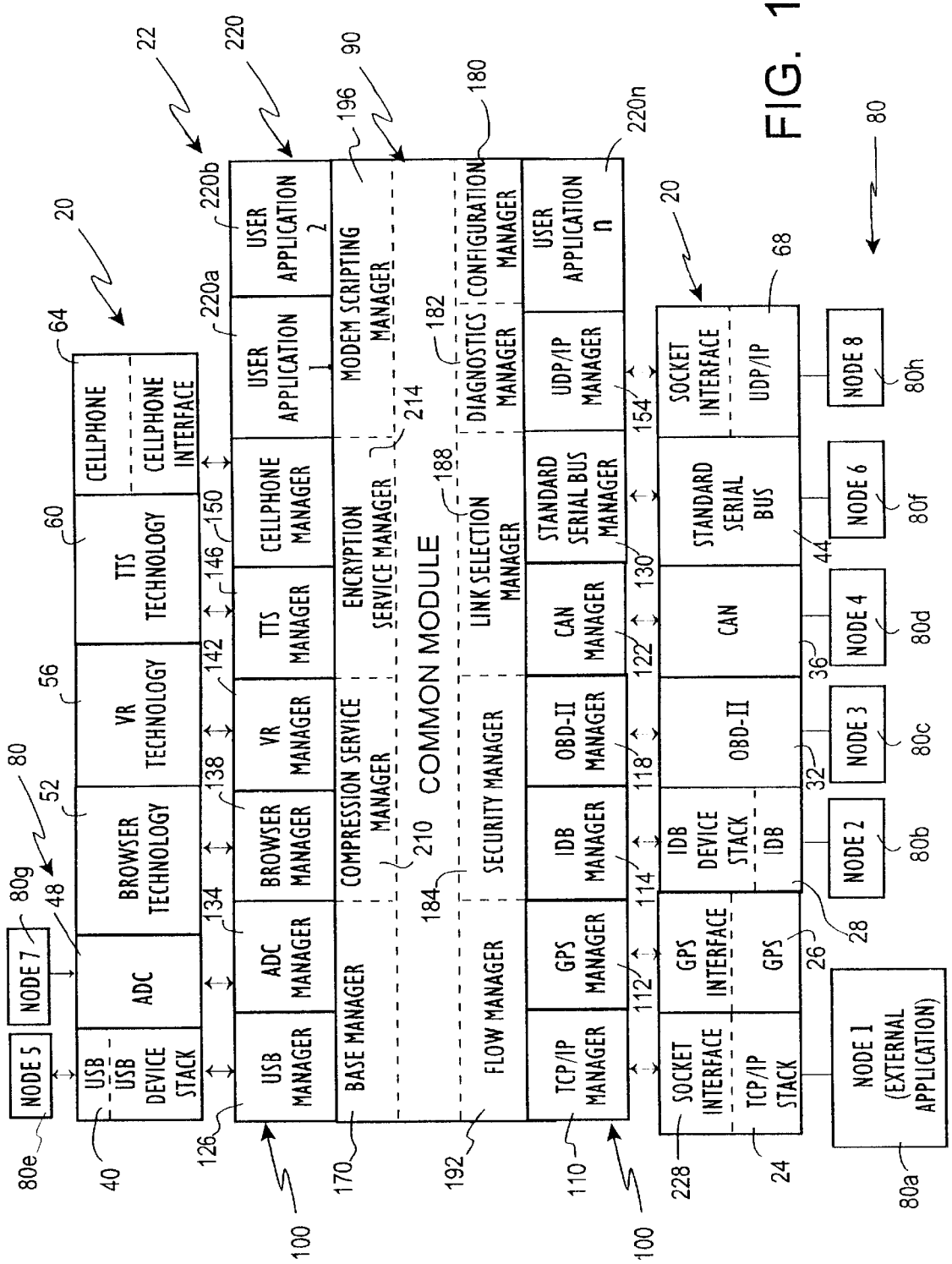
FIG. 1 is a block diagram, of the present invention illustrating the common module, disparate subsystems and disparate subsystem managers that interface between them.

With reference to FIG. 1, a system is illustrated for enabling communications among disparate technologies. Although the system has particular application in a vehicle and will be described in the context of a vehicle application, it may be beneficial in other environments, such as manufacturing facilities or other industrial complexes, offices and homes.

The system includes a plurality of disparate subsystems 20 and a communications apparatus 22. The disparate subsystems 20 in a vehicle can include one or more of the following components: Internet protocol (IP) stacks 24; a global positioning system (GPS) 26; an intelligent transportation system data bus (IDB) 28; an onboard diagnostics (OBD-II) 32; a controller area network (CAN) 36; a universal serial bus (USB) 40; a standard serial bus 44; an analog/digital converter (ADC) 48; browser technology 52; voice recognition (VR) technology 56; text-to-speech (TTS) technology 60; a cellphone 64; user datagram packets/Internet protocol stack(s) (UDP/IP), one or more custom or proprietary units or components, as well as any other presently or later devised subsystem that may be useful in a vehicle or another environment in which the system is operating.

The disparate subsystems 20 are usually characterized by the differences in their interfaces including how they communicate with other components. For example, an IP stack disparate subsystem 24 is characterized by International Standards Organization (ISO) network layering including a socket interface at the higher layer. In contrast, the OBD disparate subsystem 32 does not follow the ISO network layering but could be characterized as a single layer disparate subsystem having different interface requirements in order to properly communicate with it.

With regard to identifying these disparate subsystems 20, the IP stack(s) 24 include(s) a number of network layers typically involved in transmissions or information transfers over the Internet. The GPS 26 provides vehicle location related information, such as longitude, latitude, altitude. The OBD-II 32 is available in at least certain vehicles for use in providing engine related information, such as engine speed, pressure of certain components, etc., using sensors that may be useful in diagnosing-vehicle engine faults. The IDB 28 is a relatively new standard bus found in vehicles that has a number of vehicle elements that send/receive data or other vehicle-related information, such as fuel management or other vehicle device data, using a protocol analogous to TCP/IP. These vehicle elements can include vehicle windows, doors, air bags, lights, etc. The CAN 36 is another communications network within the vehicle for providing information from vehicle elements, such as automotive electronics including engine sensors, lamps, electric windows, etc. The USB 40 is a PC centric network that includes a bus for enabling communications among PC hardware, e.g., mouse, keyboard, printer, memory. The standard serial bus 44 accommodates information transfers from/to and among devices or components that are not presently known or not specific (e.g., unlike RS232, RS485 compatible devices). The ADC 48 can be used to output necessary digital signals for providing useful information from devices connected thereto such as automotive electronic elements that may be separate from and not associated with a particular bus. The VR technology 56 enables the vehicle driver or passenger to provide commands or other information verbally to achieve desired results including obtaining information. The TTS technology, 60 provides the user or operator with a verbal output that can be readily heard. The browser technology 52 can access and provide desired information, particularly in combination with the VR and TTS technologies, and is dependent on an Internet related external connection to satisfy the web-based request. The cellphone 64 is a useful communications tool in sending/receiving analog voice or digital data.

A number of the disparate subsystems 20 are electrically connected to one or more nodes 80 that are associated with a particular sender and/or receiver of the data/information in association with or part of the disparate subsystems 20. Representative of the nodes 80 are nodes 80a–80g. The node1 80a can include an external application that is located outside of the vehicle and is wirelessly connected to the disparate subsystem IP stack 24. By way of example, an application running on a computer station remote from a vehicle may receive vehicle data that it processes for providing a desired report. The node2 80b may be defined as including one or more vehicle elements connected to the disparate subsystem IDB 28. The node3 80c may also be characterized as one or more vehicle elements associated with vehicle engine functions that are connected to the OBD 32. The node4 80d may define a number of vehicle devices connected to the CAN 36. The node5 80e may also comprise a number of nodes, with each node associated with different PC centric hardware and/or software in communication with the bus of the USB 40. The node6 80f can also comprise or define a number of nodes, with each communicating with at least one component in the vehicle and with all of them electrically connected to the standard serial bus 44. The node7 80g can include one or more separate nodes communicating with such vehicle components as sensors or other elements that may not be part of a particular vehicle network or bus and which require the ADC 48 for providing the necessary digital signal acceptable to the communications apparatus 24. The node8 80h can include applications that communicate using the UDP protocol.

In conjunction with enabling communications between and among each of the disparate subsystems 20 including, where applicable, their associated one or more nodes, the communications apparatus 22 can be defined as including a common module or interface 90 and a plurality of disparate subsystem managers 100. Generally, among the plurality of disparate subsystem managers 100, each disparate subsystem 20 is in communication with a different, specific one manager of the plurality of managers 100. In the illustrated embodiment, there are disparate subsystem managers 110–154 in direct communication with disparate subsystems 24–68, respectively. Each of the disparate subsystem managers 100 has common responsibilities or functions. These functions include: (1) providing a native interface to the specific disparate subsystem 20 with which it communicates; (2) providing an interface to the common module 90; and (3) performing a number of management functions. Although having similarities, each manager 100 has different software for handling the native interface since the disparate subsystems 20 usually have different requirements. For each disparate subsystem 20, the management functions can include: initiating and responding to messages relative to other disparate subsystem managers 100 for the purpose of providing desired communications including those involving the transfer of data or other information between or among them; and creating connections or links between other disparate subsystem managers 20 that result in a communications path using a selected common communications protocol associated with the common module 90. In that regard, the common module 90, in one embodiment, can include two communication protocols for selection. A first communication protocol essentially involves use of request and response messaging, while the second common communications protocol essentially involves unstructured data transfer.

The common module 90 has a number of functions in operating with the disparate subsystem managers 100 including a registration procedure by which disparate subsystems 20 and other components or component processees are registered by the common module 90. As part of the registration procedure, a name or identifier is assigned to each such registered component and a message queue is established for each such component. As an example of a component process being registered, other than a disparate subsystem manager 100, once a connection is established for communication purposes between two disparate subsystem managers 100 that are connected to the common module 90, such a component process indicative of this connection is registered and such component process is assigned a dynamic name. The dynamic name is discontinued or de-registered upon completion of the particular component process, such as completion of a data transfer that involves a connection between two disparate subsystem managers 100.

With respect to registration, the common module 90 includes a base manager 170 that can be a software module for handling the registration and de-registration of disparate subsystem managers 100 and other components or component processees performing tasks or involved with communications using the common module 90. The common module 90 may also have a configuration manager 180 as part thereof. The configuration manager 180 can be a web-based configuration tool that operates using hypertext transport protocol (HTTP). The configuration manager 180 utilizes a browser interface for configuration, i.e. downloading applications, configuring routing tables, reviewing error logs and other assigned tasks. Because of HTTP usage, users can configure via a wireless modem connection, through the local Ethernet port or through an available RS232 connection using a suitable protocol, such as SLIP or PPP. Implementation of HTTP provides a way to perform remote debugging as well as perform diagnostics and/or other services.

Other managers that are part of the core platform associated with the common module 90 include a diagnostics manager 182, a security manager 184, a link selection manager 188, a flow manager 192 and a modem scripting manager 196. The diagnostics manager 182 is involved with obtaining and managing diagnostics information. The security manager 184. oversees managers 100 characterized by their use of particular protocols in communicating with their connected or associated disparate subsystem 20, as well as being characterized as being connected to disparate subsystems 20 that are not close-ended, i.e., are not disparate subsystems 20 where data or other information flow terminates or originates, such as a GPS disparate subsystem 26. In overseeing such managers 100, the security manager 184 monitors the connections made from sources outside the environment of the communications apparatus 22, such as external to a vehicle having the communications apparatus 22. The key security feature to be realized relates to monitoring external applications attempting to connect to the communications apparatus 22. The link selection manager 188 functions to provide an acceptable network link for transmitting and/or receiving information wirelessly relative to the vehicle. The flow manager 192 provides the ability to string managers together to perform, operations on the data flowing through them. The flow manager 192 mediates between an application and available services by setting up a communications pipe that can contain one or more services. The pipe exists between the application and the intended recipient of data, without the application having any knowledge that the data is being modified through the process. As an example, the communications apparatus 24 can be considered as a data flow machine in which data flows through a network of data processors that perform some action on the data. These actions are negotiated before hand by the mediator such that there is no delay in processing the data to be moved to air external site. The flow manager 192 can mediate a managed flow to a physical link. Once service agents are selected and the flow is established, the data flows through the architecture and through each of the selected service agents. In one example, the data is first compressed and then encrypted prior to being exported out of the unit via the selected physical link. Conversely, data originating from an external source can be decrypted and decompressed after being imported to an internal process which allows for bi-directional functionality that is dependent on the direction of flow of the data. The modem scripting manager 196 is responsible for initializing connections through available modems through a standard setup package.

In addition to such identified managers involved in the operation of the common module 90, service providing managers can also be included, such as a compression service manager 210 and an encryption service manager 214. The compression service manager 210 provides a service of compressing a stream of data passed from another component, such as through a stream connection. The compression service manager 210 provides the capability to pass its data to another component, typically different from the source application, to support the data flow architecture. The encryption service manager 214 provides a service of encrypting a stream of data passed from another component, such as through a stream connection. The encryption service manager 214 provides the capability to pass its data to another component, that is typically different from the source application, in order to support the data flow architecture.

The common module 90 may also be designed to have the ability to execute user applications that are in direct communication therewith. The configuration manager 180 can provide the ability to load user applications 220 (e.g. 220*a*, . . . 220*n*) into a user applications module in communication with the common module 90 and update necessary initialization files to support their execution when the system is booted up. Such user applications 220 will be provided with the ability to register with the common module 90 and then communicate freely with the operating system, such as RTOS (real time operating system) that constitutes the operating system for the communications apparatus 22, together with the disparate subsystem managers 100 to satisfy their requirements. The common module 90 also includes a processing subsystem including a processing core that can be a Power PC. The processing subsystem can also include RAM (random access memory) and mutable flash storage. The flash storage can be split into a compressed kernel image and a mutable flash file system.

The combination of the common module 90 and the disparate subsystem managers 100 provides a reliable transparent foundation for communications between disparate subsystems 20 within a mobile unit through the use of a selected common protocol that permits seamless integration among all disparate subsystems 20. The communication apparatus 22 utilizes operating system features that promote portability (POSIX), so that the communications apparatus 22 is portable to any POSIX-compliant operating system.

Processes attach to the communications apparatus 22 as "components" providing services (access to a protocol, application performing data-reduction, interface to data input device, etc.). Each component provides an interface using the communications apparatus 22 API (application programmer's interface) and, for a particular disparate subsystem 20, an interface to a native protocol or interface.

The communications apparatus 22 also promotes dynamic operation. As a new component is executed (either at boot-time or any time thereafter), it registers itself with the common module 90. This registration allows other components to know who is connected and to some extent what services they provide. When a disparate subsystem 20 or other, component wishes to be removed from the communications apparatus 22, de-registration occurs to remove its name from the common module 90 name-space.

The combination of the common module 90 and disparate subsystem managers 100 creates a common denominator for communications such that all components speak at least one common language (common protocol) and thus provide the capability to communicate to one another. The communications apparatus 22, which must support dynamic operation and transparency, provides a naming facility to achieve these goals.

The name-space within the communications apparatus 22 is split into three distinct regions. A physical name is defined as a 10-bit value (0–1023 possibilities).

| Region | Name sub-space | Description |
| --- | --- | --- |
| System Names | 0000–0127 | system names (reserved for core platform name. |
| Dynamic Names | 0128/0511 | dynamic names (allocated through the system dynamically) |
| User Names | 0512–1023 | user name space available for OEM use. |
| Broadcast | 1024 | all registered names |

Names can be either static or dynamic, which is defined by the method used to attain them. Static names are simply defined to the system during registration, where dynamic names are requested from the common module 90. As a general rule, names should be dynamic unless they are required to be static An advantage to static names is that they are always known (the mapping from name to component remains fixed) which is why servers are typically static. Dynamic names are useful for client components that do not export functionality (do not require a component to asynchronously communicate with it). An exception to this rule is made possible by a services API. The primary goal of the services API is to limit the static usage of the software bus naming service.

One of the primary uses of dynamic names are the dynamically created children of server components that manage specific communications. These children register with a dynamic name, since the child communicates only with components that requested information from the server.

One special name is the broadcast name. This name results in the message to be sent being distributed to all other registered components except for the original sender. Multicast communication is also available where components are permitted to subscribe to a particular "list." Whenever a message is sent to the identifier representing the list, each member associated with the list receives a copy of the message.

The services API provides the means to identify functionality exported by dynamically named components. A service is a simple string that defines some unique information about the component to the communications apparatus 22 and to other components. For example, the GPS manager 112 could register itself with a dynamic name (received through the communications apparatus 22) and then identify its service to the bus using the publicly available key "GPS". Other components looking for the GPS manager 112 could perform a simple lookup using the "GPS" public key, which would result in the return of the component's physical name. The ability to wait for a service name is also provided which introduces the capability of component synchronization.

Communication among components connected to the communications apparatus 22 requires a definition of rules, called protocols, to govern the manner in which communication is allowed to take place. A protocol is a formal set of rules and conventions governing the format of message exchange between two or more communicating components. The communications apparatus 22 provides two protocols through two APIs, identified as bus API and stream API.

The bus API is the lowest level of communication. It provides packet level communication between components registered with the common module 90. The next level up is the stream API that uses the bus API as its base. Each of the bus and stream APIs are part of the common module 90. The stream API provides point-to-point stream data communication. Bus communication is useful in applications where communication must be performed to a number of independent components. Stream communication is useful for unstructured stream data between two components (such as an audio stream).

The communications apparatus 22 utilizes messages in communicating with components connected thereto. A message is a typed collection of data objects consisting of a fixed size header and a variable length body that is managed by a component. A type is associated with a message to provide structural information on how the message should be used. Messages provide the basic object for communication over the common module 90 and representative message content is provided below:

| | Source | the sending component |
| --- | --- | --- |
| | Destination | the destination component |
| Message Header | Type | the message type (structural id) |
| | Length | the length of the data portion |
| Message Buffer | Variable Data | |

Each registered component is assigned a message queue for the receipt of messages. The component should manage this resource carefully to be a good neighbor on the bus (respond in a timely manner, etc.). Every time a message is sent using one of the available send primitives, it is placed on the queue defined by the component destination (the message queue owned by the destination component). In some cases, a component may register more than once. Therefore it is important to note that a component identifier may not refer to a component but instead of a specific queue of a component.

Communications apparatus 22 communication primitives operate in either blocking or non-blocking modes. In blocking mode, the sender blocks (sender waits until the message has been placed on the receivers message queue). In non-blocking mode, the sender returns immediately with an indication of whether the message was placed on the queue or not. Conversely, receiving messages operates using the same semantics. In blocking-mode, a receiver blocks if no message is available for read. In non-blocking mode, the receiver is returned an indication of whether a message was received or not.

Messages are owned by each component and are allocated from the process-specific address-space (rather than system-owned messages).

Since the communications apparatus 22 is a networking product, communications with entities that differ in processing architecture are inevitable. Issues that arise here are byte-endianess, structure packing issues and data representation issues. Not all of these problems can be completely resolved (unless a single unified architecture exists) so standards are defined here.

The byte-endian issue is resolved through the standard networking practice of network byte order. The Power PC provides this by default, so extra computing is not required to provide the byte swapping.

Structure packing issues come into play when an external process sends a message to a component of the communications apparatus 22 using a structure cast to a void pointer. For efficiency, packing is performed on 33-bit boundaries.

Finally, representation issues manifest themselves through the fundamental types of a particular architecture (for example, floating point). Numerous floating point representations exist and since the system cannot understand them all, floating point will be disseminated in the Power PC format. Knowing this information, external applications can provide conversion functions to convert the floating-point data to their specific representation. Applications may convert floating-point data to scalars or simply pass ASCII-based representations to further simplify this problem.

The lowest level of communication offered by the communications apparatus 22 is the packet-level (or bus-level since it is the bus-native format). Communication at this level is direct in that a recipient is defined for each message that is sent by a component. Addressing at this level is symmetric given a recipient is defined for each message and also a recipient handle is defined for a bus-level receive operation for a component.

Prior to a component communicating over the common module 90, it must first register. The registration occurs with the base manager 170. Once registration has occurred, the component may send and/or receive messages over the communications apparatus 22. When communication is no longer necessary, de-registration occurs. This process is again managed with the base manager 170 through the bus API.

The bus-level also provides other useful functions such as dynamic name request, name lookup and a default message handler.

The communications apparatus 22 can provide different messaging functions including broadcast messaging and multicast messaging. Broadcast messaging is achieved by sending a message to a special destination name, which results in the message being sent to all registered components. Broadcast is a useful mechanism on the communications apparatus 22 for synchronized start and shutdown.

In some applications there is the need for multicasting, which allows a subset of the communications apparatus 22 to receive messages of the same type. Multicasting is provided by the communications apparatus 22 through the registration of a dynamic name that represents the list of multicast members. A multicast list may be defined as a service. Therefore, other components may identify a multicast address by a particular name and/or wait-for it using the service API synchronization.

Above the bus-level of communication are stream communications. Streams, as the name implies, are point-to-point connections between two components where unstructured data is moved between them. The primary difference between streams and the bus-level API is that streams permit a connection to another component and then one-to-one communication. The stream API provides communication primitives (such as send and receive) but also server-specific primitives for developing information servers. Stream level communication utilizes simple streams of byte-data rather than structured messages. Once the connection occurs, byte-data is streamed between the two end-points. Stream primitives may be configured for blocking or non-blocking operations based upon parameters passed at stream connect.

Since the communications apparatus 22 is an open architecture and, depending upon the particular application, highly available through a number of links, security is a key issue. Security can be established on three fronts. The first is external user access, the second is application and the third is data. Each level is dependent on the next for security. Communication security comes into play when external entities desire connectivity to or from the communications apparatus 22. Basic security mechanisms protect against access through telnet, ftp or tftp (standard UNIX® mechanisms).

Application security is required for external applications that wish to connect to the communications apparatus 22. When an external application wishes to connect to the communications apparatus 22, the security manager 184 of the communications apparatus 22 is consulted first to identify if the connection is authorized (through its internal security directives). For example, when an external application connects through the TCP/IP manager 110, the security manager 184 will define whether the connection is legal by identifying the host of the external application. The security manager 184 defines not only whether a connection is legal by identifying the host of the external applications but also whether the particular destination of the connection is acceptable. By way of further example, the security manager 184 may define that the TCP/IP connections are approved from a first host to the USB manager 126, but not to the OBD manager 118 or a second host associated with the IDB 28 may access the GPS 26, but not the TCP/IP 24.

Data security is provided through the use of the encryption service manager 214 that encrypts data prior to being shipped through the link. Conversely, decryption managers of the common module 90 function to decrypt data from an outside source into the communication apparatus 22.

The communications apparatus 22 operates in two basic functional modes. These are identified as the "pure bridge" mode and the "application" mode.

In pure bridge mode, the communications apparatus 22 operates using two protocol managers (e.g. IP/TCP manager 110 and IDB manager 114) to create and maintain connections essentially controlled by a source or application located outside the environment of the communications apparatus 22. One such manager acts as the source protocol manager for the incoming connection and the other such manager acts as the destination protocol manager. The transferred data or other information is not destined for use internally but is to be moved from one subsystem (e.g. bus) to another subsystem. Applications running in external nodes operating over different buses force the creation of connections which bridge the available buses or links within the vehicle or other environment.

For example, consider the communications apparatus 22 providing connectivity to TCP/IP 24, IDB 28 and GPS 26. The TCP/IP 24 and IDB 28 are provided through the TCP/IP and IDB managers 110, 114 and the GPS 26 is provided through the GPS manager 112. These software components execute as part of the communications apparatus

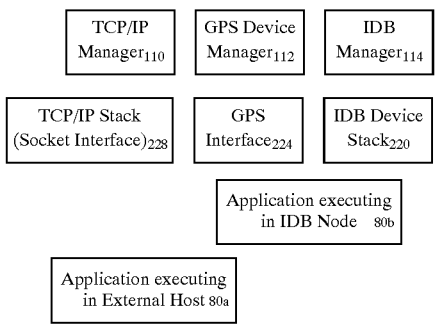

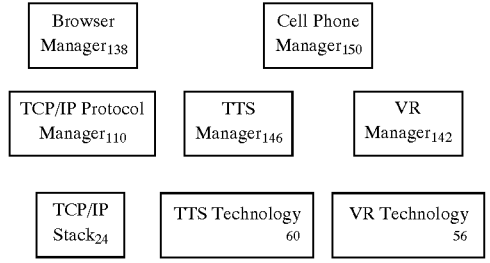

Consider a node connected to an IDB device stack 220 that wishes to gather vehicle location data and then communicate this data to the external node1 80a on the Internet.

The IDB application connects to the communications apparatus 22 node using the IDB device stack 220 and the IDB manager 114 with a packet header defining the action to take (connect to the GPS manager 112 utilizing the GPS interface 224). The IDB manager 114 would create a child component (along with the GPS manager 112) to provide the read-only data through the IDB device stack 220 back to the requesting application. This connection could be stream-based (data would stream to the IDB-based external application when updated, or could be asynchronous in a request/response mode) The IDB application next connects to the TCP/IP manager 110 (utilizing the socket interface 228) with another packet header (specifying the requested connection to the TCP/IP manager 110 along with the external host for which the connection should be made). The TCP/IP manager 110 would then make the connection to the external host, and bind a child process to handle the particular connection.

This process is identical regardless of the particular network being used by the connecting application, for example the USB 40 would use the same process. Applications can also create connections through TCP/IP 24 thereby providing Internet-based enterprise level access to devices connected to the communications apparatus 22. The security manager 184 limits access to only appropriate hosts.

Stream modes of communication (for unstructured data) and packet modes (for structured data) are provided through the communications apparatus 22.

The previous section defined a mode whereby a protocol (TCP/IP 24) and a device manager (GPS 26) provided the necessary functionality to bridge a device and route between protocols for externally controlled applications (external applications are in control of data flow through the communications apparatus 22). The application mode differs in that the users of the data can be maintained on the communications apparatus 22.

The communications apparatus 22 provides an open architecture for the development of onboard applications. A developer can link the communications apparatus 22 libraries to gain access to the communications apparatus 22 to connect to any manager (protocol, device or other). The APIs are consistent among all components, the data simply differs to change the behavior of the communication.

Consider the following example utilizing voice recognition and text-to-speech in a vehicle application. The voice recognition (VR) manager 142 provides a server using existing VR technology 56. The VR manager 142 accepts the recognized speech in terms of grammatical tokens that identify the parsed sentence. The VR manager 142, in this application, requires that any voice command be preceded by a destination entity (for example, browser, GPS, etc.). For example, "browser, search for X". This prefix identifies to the VR 142 manager the destination of the particular speech unit.

Applications connect to the VR manager 142 defining their particular name such as "browser" or "cellphone". A speech is recognized and parsed, the speech tokens are passed to the particular manager.

In this application, the browser manager 138 would notify the VR manager 142 that it is available and its name is "browser". This defines the browser 52 as a user of the VR manager 142 and a destination for speech preceded by the name. When the VR manager 142 (using the available driver) parses the sentence "browser what is the nasdaq doing?", the word-tokens are passed to the browser 52 (or more likely through a parser which identifies the semantics of the request who then passes the raw information to the browser 52). If the sentence is not understood by either entity, the text-to-speech (TTS) 146 manager is provided with a canned "I do not understand your request" statement. Otherwise, the browser 52 tries to satisfy the request (likely through the TCP/IP manager 110) and then returns the result back through the TTS manager 196. The TCP/IP manager 110 may involve the TCP/IP disparate subsystem 24 as part of gathering requested information outside of the vehicle, which information is located at a remote site, such as a web site.

This illustrates the application mode of the communications apparatus 22 where data management is essentially under control within the vehicle or other environment in which the communications apparatus 22 is located. It should be noted that the VR manager 142 could be used in bridge mode as well, where an external application could register a name and the speech tokens would be routed to the particular application on its bus (IDB 28, USB 40, etc.).

Figure 2:
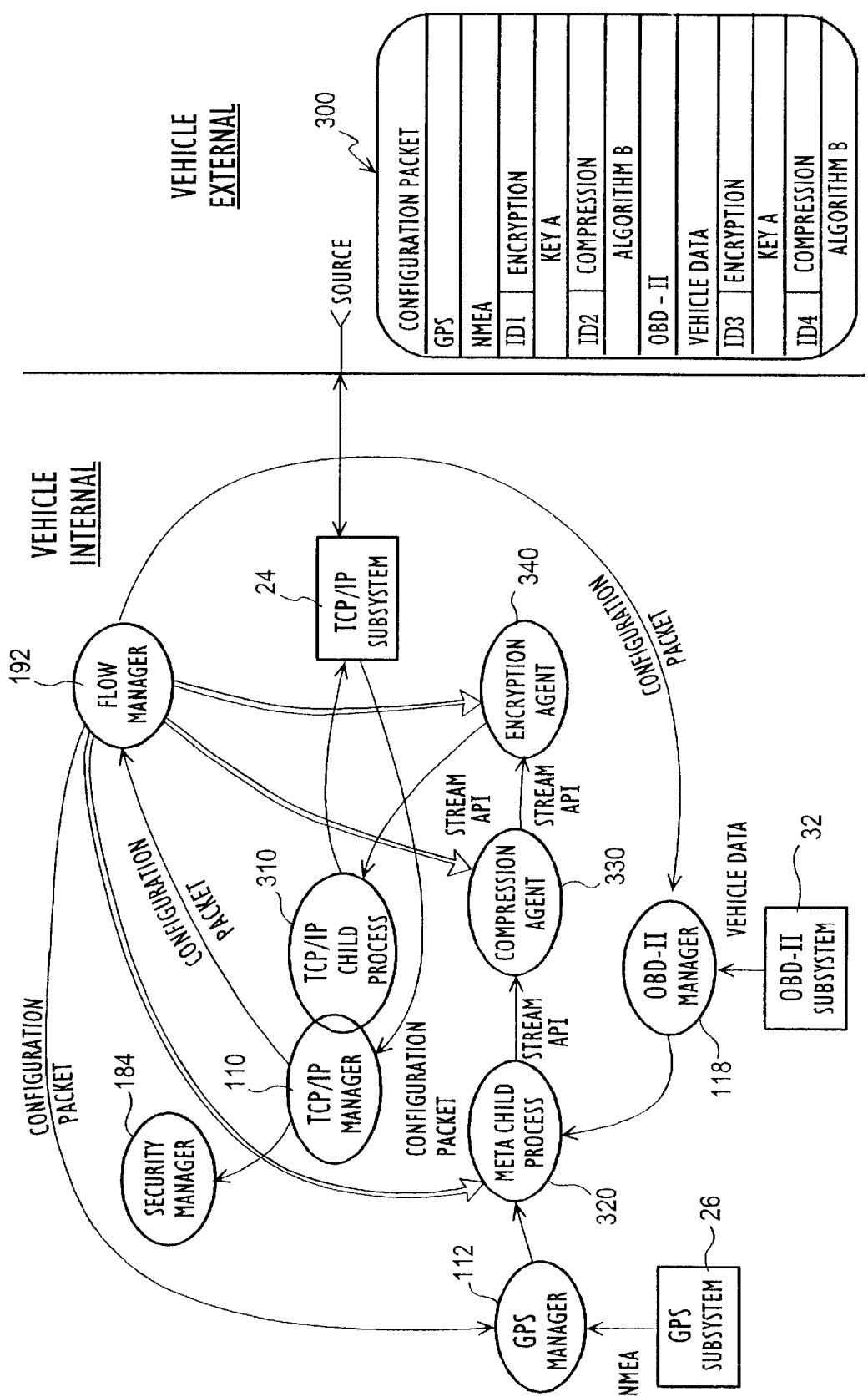
FIG. 2 is a flow diagram related to exemplary communications among disparate subsystems involving the communications apparatus.

An additional description related to the components and operations of the system is next provided with reference to FIG. 2. A flow processing diagram is depicted related to functions, operations and steps associated with obtaining information from inside a vehicle having the communications apparatus 22, pursuant to a request from an outside source or destination that is external to the vehicle. Generally, in accordance with this representative example, the source or remote stations is seeking vehicle information related to vehicle position and engine speed. Such information is in the form of data obtained from the GPS subsystem 26 and the OBD-II subsystem 32. The GPS subsystem 26 has position data in the form of latitude, longitude and altitude associated with the vehicle. The OBD-II subsystem 32 includes data related to engine speed.

In this embodiment the source seeking such data develops a configuration packet 300, which has the necessary request information including a destination, services that might be invoked, and data or other information being requested. In this example, the configuration packet 300 may be defined as having a number of fields that convey what is being requested by the source. The configuration packet 300 can include information related to the identity of the disparate subsystem from which data is being requested, such as the GPS disparate subsystem 26. Associated with this particular subsystem, the data being requested is identified in a further field, namely, the NMEA conventionally identified data from the GPS subsystem 26. As part of the GPS field, it may have a number of sub-fields that particularly identify GPS parameters, such as one or more of latitude, longitude and altitude as part of the data transfer from the vehicle to the source. For one or more reasons including security, the configuration packet 300 also requests that the returned data from the vehicle be encrypted so that this service request is also part of the configuration packet 300 and can have an identifier (Id 1) associated with it. In conjunction with the encryption request, a key accompanies the configuration packet 300 related to how the data being obtained is to be encrypted. A further service being requested with this data transfer, for one or more reasons such as the amount of the data being requested, the configuration packet 300 also has a compression service request by which the requested data will be compressed before sending from the vehicle to the source. An identifier (Id 2) can also be associated with this particular service request for any desired identification purpose. As part of this service, the source can perhaps select one or more algorithms that would be utilized in providing the compression and such as identified in one of the fields of the configuration packet 300.

As previously noted, the data being requested is not only from the GPS subsystem 26 but also from the OBD-II subsystem 32. Thus, the configuration packet 300 also includes similar fields to identify the particular subsystem from which data is being requested (OBD-II subsystem 32), together with the particular data, such as engine speed. In this example, this data is also to be encrypted and compressed using the same key and algorithm associated with the GPS data.

After the configuration packet 300 has been prepared, it can be transmitted, including wirelessly, from the source to the vehicle. In a preferred embodiment, the transmission of this configuration packet 300 utilizes the Internet and with at least the vehicle to which the configuration packet 300 is being sent having an Internet address, which accompanies the configuration packet 300. The recipient device in the vehicle of such a configuration packet is the wireless device or cellphone 64, as well as a wireless modem associated therewith. The configuration packet 300 from the Internet using TCP/IP is received by the TCP/IP subsystem or protocol stack 24. This subsystem can handle and act on the received configuration packet 300 including recognition of the associated address. In direct communication is the TCP/IP manager 110 which reads the configuration packet 300. Upon such reading, among other things, it is recognized that the configuration packet 300, given its request, is appropriate for functions to be performed by the flow manager 192 of the common module 90. Hence, the configuration packet is also sent to the flow manager 192.

As part of this operation description for obtaining such data, the configuration packet 300 is applied to the security manager 184 of the common module 90. The security manager 184 is used in determining whether or not the source, together with the information being requested, has authorization to use the communications apparatus 22 and obtain the requested information. In that regard, the security manager 184 may utilize a list, which identifies authorized users and/or what information or other accessing this user (source) might be entitled to. Based on this checking, the security manager 184 determines that this request from the identified source is authorized. This determination allows the common module 90 and necessary managers 100 to continue their task in connection with satisfying the contents of the configuration packet 300.

In view of the data being requested, a stream API is to be employed in transferring, the requested data. In conjunction with that, the TCP/IP manager 110 creates a TCP/IP child process 310 that will be involved in sending the requested data from the vehicle using a socket interface associated with the TCP/IP subsystem 26. When created, the TCP/IP child process 310 is registered with the common module 90 using the base manager 170. Thus, for this particular data transfer, this dynamically created process and identifier is involved with the TCP/IP transfer, while other TCP/IP transfers could be accomplished under management/control of the TCP/IP manager 110.

With respect to the configuration packet 300 being sent to the flow manager 192 and its responsibilities, upon reading the configuration packet 300, the flow manager 192 recognizes that GPS data and OBD-II data are being requested. The flow manager 192 generates a message including a request to the GPS manager 112 by which the data being requested from the GPS subsystem 26 can be obtained. In that regard, the GPS subsystem 26 is inputting the NMEA data to the GPS manager 112, which data can be readied for transfer along a determined path. In that regard, the flow manager 192 is also involved with satisfying further requirements related to the data transfer including the compression and the encryption services that were requested. Furthermore, because in this example OBD-II data is also being requested, the flow manager 192 is used in generating a meta-child process 320 for desirably enabling and facilitating the two sets of data transfer. The meta-child process 320 is also registered using the base manager 170 with the common module 90. The meta-child process 320 acts as a handler and is otherwise responsible for managing the obtaining of GPS data and the OBD-II data. Accordingly, a GPS data stream is provided to the meta-child process 320. Similarly, the requested engine speed data from the OBD-II subsystem 32, in the form of a data stream is handled by the meta-child process 320 through the OBD-II manager 118.

Continuing with a description of this example of operation, the flow manager 192 is also involved with the spawning of a compression agent or child process 330 and an encryption agent or child process 340. Each of the compression agent/child process and encryption agent/process 330, 340 are registered with the common module 90. Like the stream API that is established for transferring the GPS data using the meta-child process 320, a stream API is utilized in transmitting the combination of GPS and OBD-II data using the compress child process 330 from the meta-child process 320. The compression child process 330 has responsibility for compressing the GPS and OBD-II data using the compression operation or algorithm identified in the configuration packet 300. This compressed combination of data can then be encrypted using the encrypt agent or encryption child process 340, as the compressed data under a stream API connection interface is received by the encryption child process, 340. This child process 340 encrypts the two sets of data using the supplied key from the configuration packet 300. The compressed and encrypted GPS and OBD-II data can then be sent wirelessly to the requesting source under the management/control of the TCP/IP child process 310 through the TCP/IP subsystem 26, with reliance on the same Internet technology and wireless technology that provided the request from the source in the form of the configuration packet 300.

As can be appreciated, numerous variations and adaptations can be implemented utilizing the basic architecture of the common module 90 and the managers 100. For example, instead of the flow manager 192 spawning the compression agent 330 and the encryption agent 340, the compression service manager 210 and the encyrption service manager 214 could take responsibility for the requested compression and encryption functions. Instead of the described usage or reliance on the flow manager 192, the TCP/IP manager 110 and/or GPS manager 112 could have more managerial responsibility related to the processing and flow of the requested data. The GPS manager 112 might be involved in the spawning of the meta-child process 320. The TCP/IP manager 110 may send the configuration packet 300 to the GPS manager 112. Alternatively, instead of the essentially dynamic routing that occurs through the receipt and use of the configuration packet 300 by the communications apparatus 22, an alternative kind of routing involving the communications apparatus 22 might be based on the use of one or more port numbers. From the identified port number associated with the communications apparatus 22, the input request may be routed directly to that port. Similarly, a communications apparatus destination identification may be provided to the communications apparatus 22, which is mappable to a particular component of the communications apparatus 22.

In further understanding and/or disclosing the inventions, particularly as related to selection of desired communication links or channels, U.S. Ser. No. 08/778,897 filed Jan. 3, 1997 is hereby incorporated by reference in its entirety.

Based on the foregoing description, it is seen that the communications apparatus 22 provides a software framework for the development of complex communication systems. It provides a set of core APIs that provide communication primitives and also service advertisement, data broadcast and multi-cast and event synchronization. The communications apparatus 22 permits dynamic plug-and-play registration and de-registration from it which provides for a completely dynamic and run-time configurable architecture. The architecture provides a simple set of APIs for communication systems development. The architecture may be easily extended with new drivers and applications. The communications apparatus 22 has a dynamic feature in that software components may engage and disengage from it when desired. The communications apparatus 22 has a transparency feature in that components are decoupled through the message-passing architecture. The architecture promotes software reuse through standard components that provide intergrowth functionality. The communications apparatus 22 enhances platform independence, particularly by the use of the POSIX layer of a RTOS so it is portable to different operating system and hardware architectures. The communications apparatus 22 provides a framework to simplify development by providing a common interface to a variety of protocols and interfaces. A plug-and-play building block approach to systems development allows developers to quickly bring products to market using the communications apparatus 22 in addition to reducing their overall development cost. The communications apparatus 22 provides two modes of operation. An application mode allows applications connected to the communications apparatus 22 to utilize connected interfaces by means of common protocols. The second is a bridge mode that allows external applications connected to the communications apparatus 22 through one of the defined common protocols and then connect to another protocol or device to communicate. The second mode provides a bridging and routing function between different protocols where essential control exists outside the communications apparatus 22. The communications apparatus 22 has particular applicability in a vehicular environment and serves as a router/server. In a vehicle, the communications apparatus 22 provides the ability to route between a number of different protocols and buses as well as manage one or more wireless links. Fundamentally, in the vehicular environment, the communications apparatus 22 bridges disparate vehicular buses to permit resource and information sharing, bridges vehicular buses and one or more wireless links, allows for dynamic selection of wireless links and bridges between consumer/entertainment buses. Particularly in the context of vehicle applicability, the communications apparatus 22 of the present invention facilitates the following applications: data logging/reduction, vehicle diagnostics, fuel management, engineering data gathering and/or processing, vehicle location and mobile office features. The communications apparatus 22 has enhanced the interoperability in the communications field by enabling communications among non-standard and standards-based technologies. The communications apparatus 22 not only interprets the variety of protocols used within a vehicle but allows Internet protocol capability to be conveyed over a variety of wireless network standards. Applications for the communications apparatus 22 can be developed using software libraries associated with the communications apparatus 22.

The communications apparatus 22 allows direct connection to vehicular signals such as by way of the CAN, RS232 and Ethernet. Application software can be developed to poll, filter, collect, process and store data collected from the vehicular network. The communications apparatus 22 can issue commands to such bus interfaces for interrogation and control of peripheral bus-connected devices, such as the GPS or an engine control module. Almost any local bus can be accommodated using suitable hardware and software. Proprietary bus or data-gateway interfaces can be developed for special applications. The communications apparatus 22 can also be configured as a gateway between multiple vehicular local buses to allow the various elements that communicate with each other. Some examples of vehicular data sources are transponders, sensors, timers, engine control components, operator data interfaces, as well as the GPS. Data from the host sent to the vehicle to communicate with the operator, provide GPS information, run diagnostic routines, reconfigure data collection routines, download code and run executable software. Analog and digital signals are acquired using vehicular networks or common serial interfaces. Some vehicular networks also include short range wireless LANs for data collection and user interface requirements.

A further enhancement of the present invention is next described with reference to FIG. 3. In an embodiment utilizing the technology of FIG. 3, communications involving a number of communication apparatuses 22 located, for example, in a number of vehicles are facilitated. Such an embodiment has particular utility in the context of a number of vehicles owned/operated by the same entity. This application may involve a vehicle fleet entity having a number of vehicles, with each of the vehicles being monitored, as well as supplying information to them.

Functions and objectives related to managing such embedded computer apparatuses 22 within a fleet of vehicles include: properly and securely reconfiguring software on the communications apparatus 22; properly and securely updating software on each such apparatus 22; diagnosing problems associated with each communications apparatus 22; and monitoring operation and routinely providing status information associated with each computer apparatus 22.

Figure 3:
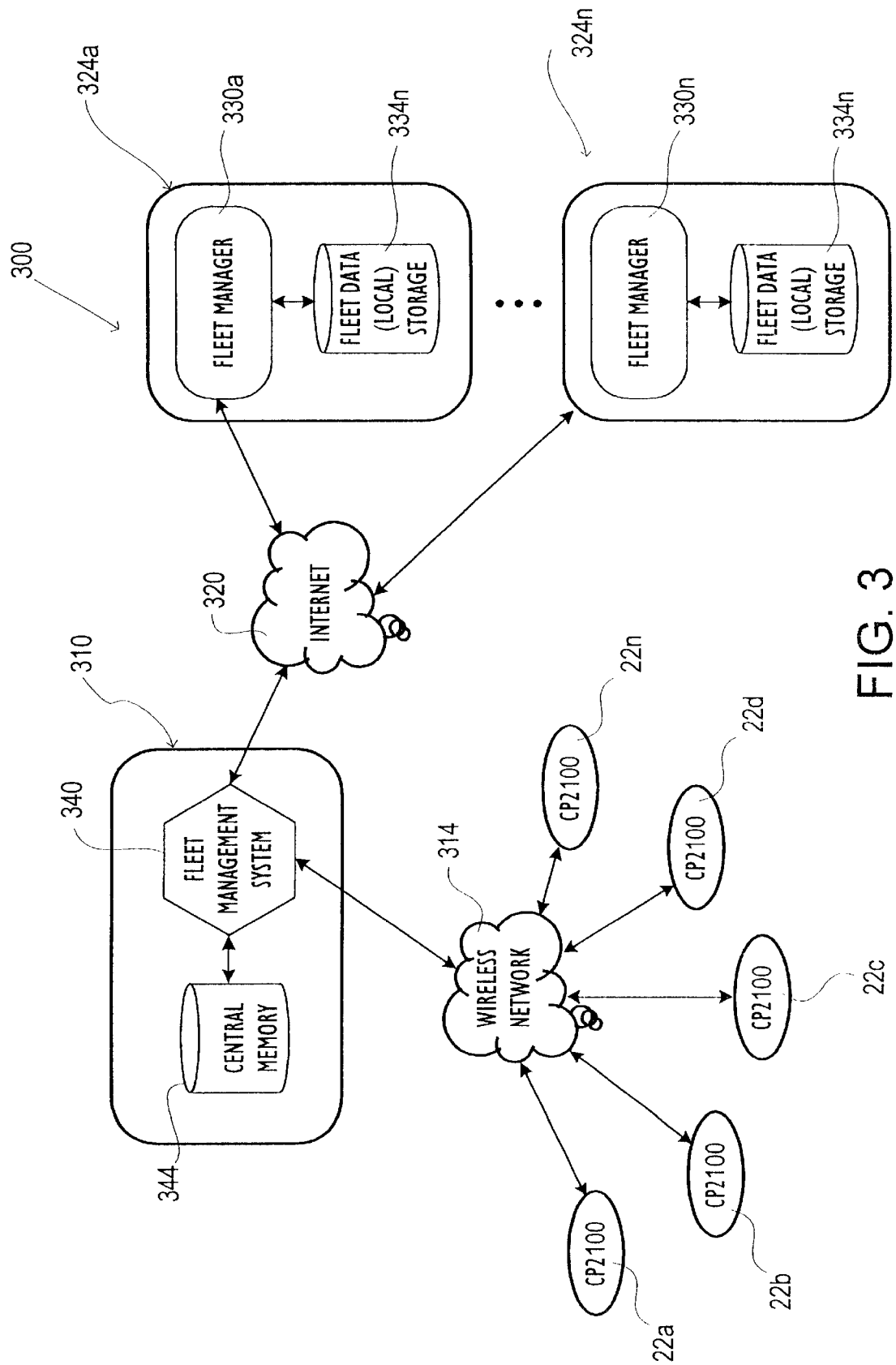
FIG. 3 is a block diagram illustrating a portal apparatus for use with vehicle fleet subsystems.

To achieve these objectives and functionalities, FIG. 3 illustrates a system 300 characterized by a management portal apparatus or module 310. The portal apparatus 310 is separate and remote from each of a plurality of communications apparatuses 22a, 22b . . . 22n. The portal apparatus 310 communicates with each of the communications apparatuses 22a–22n, which may be embedded in different vehicles and constitute a fleet of vehicles, by means of a wireless network 314. The wireless network 314 can include the Internet 320 and its associated technology.

The system 300 also includes one or more vehicle fleet subsystems 324a . . . 324n. Each of these fleet subsystems 324 is typically located at the facility of a particular vehicle fleet owner/operator. Each fleet subsystem 324a . . . 324n can include fleet manager hardware and software (processing and controlling capabilities). 330a–330n, respectively. Such hardware and software is involved with managing the communications, such as requests and commands, or otherwise controlling the flow of information related to the member/vehicles in the vehicle fleet or set. By way of example only, the fleet manager 330a may manage one or more of the vehicles having some of the communications apparatuses 22a . . . 22n, while the fleet manager 330n may be involved in managing others of the vehicles having different ones of the communications apparatuses 22a–22n. With regard to maintaining or storing data or other information related to the vehicles that they manage using the respective communication apparatuses 22, each fleet subsystem 324 communicates with and has responsibility over a fleet data memory or storage 334, which is part of the particular fleet subsystem 324. Each such fleet data memory 334a . . . 334n can store data obtained from the vehicles in the fleet for later access and use, particularly evaluation and analysis, such as in the context of monitoring vehicle data related to proper operation of the vehicle.

With respect to communications with one or more fleet vehicles of a particular fleet subsystem 324, the Internet 320 is preferably involved by which each such fleet subsystem 324 can access the portal apparatus 310. In providing services and functionalities requested by the fleet subsystems 324, the portal apparatus 310 acts as a web-based interface or middle-ware component useful in managing one or more devices in each vehicle of the fleet-and monitoring them for proper operation. Generally, the services and functions of the portal apparatus 310 can be construed as involving data management or system management. The tasks and operational steps associated with data management that can be conducted involving the portal apparatus 310 can be as varied and ubiquitous as necessary for the fleet entity's requirements. Since system management is less diverse (customization for a particular fleet subsystem 324 not as prevalent), the system operation of the portal apparatus 310 can be described more completely.

The portal apparatus 310 is a "port-of-entry" for access to fleet information. The portal apparatus 310 provides a web-based interface to a particular set of information and allows authorized personnel to review information on their respective communications apparatuses 22. Additionally, updated and/or new software can be identified that is of relevance to the particular fleet (new or updated managers, more than trivial software bug-fixes, etc.). The portal apparatus 310 provides a web-based interface such that the communications apparatuses 22 in the field can be scheduled for remote maintenance whether software and/or configurations are updated based on the desires of the particular fleet owner/operator. The portal apparatus 310 can also act as a notification service provided such that fleet managers 330a . . . 330n are notified of issues when they occur. This is in addition to the previously noted functionalities such that managers can browse assets as well as set triggers for automatic notification. The portal apparatus 310 includes a fleet management system 340 in the form of appropriate hardware and software involved in managing or controlling communications with the communications apparatuses 22 in vehicles of one or more fleets, together with communications involving the one or more fleet subsystems 324. The portal apparatus 310 also includes a central fleet data memory or storage 334 that contains parsed information received from the numerous communications apparatuses 22. The information is received in a variety of forms, depending upon the link device used within the communications apparatus 22, such as e-mail via pager, stream socket via CSC, etc.

With regard to reconfiguration updates, each communications apparatus 22 is a highly configurable unit that permits the execution of numerous applications satisfying a number of different requirements. The ability to reconfigure applications at any time is a challenge since vehicles can be located anywhere in the country, depending upon the customer. Hence, there is a need to remotely reconfigure and/or update software on one or more communications apparatuses 22 safely without creating the need for hands-on access to the particular communications apparatus 22. In conjunction with achieving this objective, a "transaction-based" solution is utilized to insure the integrity of the particular communications apparatus 22 after any change has occurred. In providing a new configuration or software update, it is preferably sent as a single file from the portal apparatus 310 to the one or more selected communications apparatuses 22 through the wireless network 314. The single transfer involving all updates for a particular communications apparatus 22 better avoids missing one or more files due to communication or user error. Once the updated information (different configuration of software) arrives at the particular communications apparatus 22, it is verified. Such a verification can be accomplished using a checksum or other integrity checks. After doing so, the update is applied to the particular communications apparatus 22. Applying the new configuration or update is performed in a secure fashion whereby changes are not immediately applied to active files in the communications apparatus 22 but instead to mirrors of the targeted files. In that regard, the configuration manager 180 is responsible for updating software and/or a configuration for a particular communications apparatus 22. Upon receiving the new configuration or software update, the configuration manager 180 is responsible for extracting changes from the configuration in the file and applying them to the communications apparatus 22 in a shadow or mirror form. Once application of the file is complete, the configuration manager 180 performs a post update check and then notifies the portal apparatus 310 that the operation was successful. More particularly, when the new configuration or software update arrives from the portal apparatus 310, the configuration manager 180 updates, shadow files in the particular communications apparatus 22. Once the configuration update is approved, the configuration manager 180 migrates the shadow files to the active or current file. A post update check is made. The portal apparatus 310 is notified of the successful updating. Once notified, the portal apparatus 310 is aware of the new configuration or update.

An unsuccessful reconfiguration results in file histories and checksums being sent back to the portal apparatus 310 in order to reconstruct the update process and provide another configuration to bring the particular communications apparatus 22 up to the desired revision. The update process can be customer driven, based on updated software for new requirements, or by the recommendation of the portal apparatus 310. The portal apparatus 310 is aware of which communications apparatuses 22 use a particular revision of software. In that regard, the configuration manager 180 has the capability to interrogate a communications apparatus 22 and identify the revision(s) of software and configuration being used by that particular communications apparatus 22.

The system 300 also has the capability where components thereof may be applied with an indication of their priority or need for update. With that information, the portal apparatus 310 can automatically notify the fleet owner/operator of changes that were incorporated. Such notification could include what needs to be changed and the objectives sought to be served by making the changes, such as bug-fixes, new functions, etc. Based on the notification, the fleet manager 330 of a particular fleet subsystem 324 could then direct the portal apparatus 310 to update one or more communications apparatuses 22 within the domain of that fleet subsystem 324. Such a process involving automated updating and notification would require dependency analysis to understand the dependencies among components for proper operation, but the process could also be automated to integrate customers into the evolution of the software.

Further functionality associated with the portal apparatus 310 involves the gathering of diagnostic and operational data from the communications apparatuses 22. Such data enables the system and its users to understand how the communication apparatuses 22 are used and under what conditions, which information is beneficial in optimizing and enhancing its operation and functionality. Diagnostic data for such purposes can be emitted in a special compressed form to the portal apparatus 310 whereby the operations of the communications apparatuses 22 in the field are monitored and corrective actions can be taken when data indicates that such corrections are necessary or appropriate.

In connection with taking responsibility for handling diagnostics data, the diagnostics manager 182 is involved in collecting and relaying diagnostic data from the communications apparatus 22 to the portal apparatus 310. More particularly, within the communications apparatus 22 as the managers are made aware of activities that are not normal or need to be reported (time-outs expired, resources unavailable, etc.), they notify the diagnostics manager 182. At the same time, the diagnostics manager 182 is collecting secondary data such as current available memory, temperature of the communications apparatus 22, process load, altitude, current time, as well as other relevant information. This data is compressed such that its transmission does not overload the available communications link. In that regard, the diagnostics manager 182 must also be configurable to limit data and emission when links, such as pager devices, are used. Each data piece can be accompanied by a severity indicator (informational, warning, error, etc.) so that the diagnostics manager can limit their emission when desired.

Diagnostic data can come in many forms and the diagnostics manager 182 receives data from operating managers as well as collecting parameters itself from pertinent parts or components of the communications apparatus 22. Collected events or other information are compressed to do a stream that, on a periodic basis or depending upon severity of the event, are transmitted to the portal apparatus 310. The diagnostics manager 182 based upon the configuration of the particular communications apparatus 22 also filters the events. For example, in a communications apparatus 24 that has routine access to a CDPD connection, all events may be emitted including informational and warning messages. In a communications apparatus 22 that has only access to a two-way pager device, only critical and error events are emitted to reserve bandwidth for actual applications.

The result from the particular communications apparatus 22 is a fusion of data from numerous applications into a compressed stream of data that can be later decompressed and automatically parsed and archived at the fleet data memory 334 or central storage 344 of the portal apparatus 310. The stream represents a history of the operation of the particular communications apparatus 22 that can be used to reconstruct the occurrence of a failure or intermittent problem within the communications apparatus 22 to identify its cause. The benefit relates to the ability to correlate an error that appears in one communications apparatus 22 with other such communication apparatuses 22 that function similarly. Based on such a mass of information, errors or other unwanted functioning can be better handled Related to obtaining diagnostics data from one or more communications apparatuses 22 is the handling of such received data by the portal apparatus 310. The majority of such data represents informational events that are simply logged within the portal apparatus central memory or database 344. An error of one or more events can be flagged for review or e-mail could be generated to inform a recipient through event filtering and notification of a critical event that requires immediate attention. The particular fleet subsystem 324 could also be notified so that it is up-to-date on the status of its fleet. The portal apparatus database 344 is both hierarchical and temporal in nature. At an upper level are the identified fleets. At lower levels and associated therewith are the particular vehicles within the fleet and their specific configuration information. For each vehicle, the event stream represents a temporal line identifying the activities of the particular communications apparatus 22 during its life. Data mining could also be employed to identify relationships within the data to better understand the causes of intermittent problems. A further aspect related to the portal apparatus 310 could include providing developer access to software assets of one or more communications apparatuses 22. The assets might include updated software, new APIs, technical notes and errata. Developers could browse publicly available lists that identify problems for use in arriving at solutions, as well as download new managers and interface header files for their internal development. The portal apparatus 310 could also provide technical information for the development of communications apparatus software to globally spread and share useful information.

The foregoing discussion of the invention has been presented for purposes of illustration and description. Further, the description is not intended to limit the invention to the form disclosed herein. Consequently, variations and modifications commensurate with the above teachings, within the skill and the knowledge of the relevant art, are within the scope of the present invention. The embodiments discussed hereinabove are further intended to explain the best mode known of practicing the inventions and to enable others skilled in the art to utilize the inventions in such, or in other embodiments and with the various modifications required by their particular applications or uses of the inventions. It is intended that the appended claims be construed to include alternative embodiments to the extent permitted by the prior art.

What is claimed is:

1. A method involving the transmission of information, comprising:
   providing a communications apparatus located in a vehicle and that includes:
      a plurality of common module managers including: a flow manager that manages data flow using components, a security manager that monitors connections outside said communications apparatus, a configuration manager that performs configuration tasks including downloading applications and also including at least one of: a compression manager that compresses information and an encryption manager that encrypts information; and
      at least first, second, third and fourth disparate subsystem managers;
   providing at least first, second, third and fourth disparate subsystems;
   conducting a first operation including:
      sending a first message from said first disparate subsystem to said first disparate subsystem manager, said first message including identification information of said second disparate subsystem manager and a first request for first information involving said second disparate subsystem manager;
      receiving said first request by said first disparate subsystem manager;
      providing at least information related to said first request to said second disparate subsystem manager;
      accessing said first information from said second disparate subsystem in communication with said second disparate subsystem manager;
      transmitting said first information using said second disparate subsystem manager;
   wherein said first operation is conducted using at least two of said common module managers and in which each of said at least two common module managers are different from said compression manager;
   conducting a second operation including:
      sending a second message from said third disparate subsystem to said third disparate subsystem manager, said second message including a second request and identification information of said fourth disparate subsystem manager;
      receiving said second request by said third disparate subsystem manager;
      providing at least information related to said second request to said fourth disparate subsystem manager;
      responding to said second request by said fourth disparate subsystem in communication with said fourth disparate subsystem manager;
   wherein said second operation is conducted using at least two of said common module managers and in which each of said at least two common module managers is different from said encryption manager;
   wherein said first disparate subsystem is required to communicate with said first disparate subsystem manager related to said first message, said second disparate subsystem is required to communicate with said second disparate subsystem manager related to said first information, said third disparate subsystem is required to communicate with said third disparate subsystem manager related to said second message and said fourth disparate subsystem is required to communicate with said fourth disparate subsystem manager related to responding to said second request and each of said first, second, third and fourth disparate subsystem managers has a native interface that is different from the others to enable communications with said first, second, third and fourth disparate subsystems, respectively, and in which said common module managers are located in the vehicle, said at least four disparate subsystem managers are located in the vehicle and said at least four disparate subsystems are located in the vehicle.

2. A method, as claimed in claim 1, wherein:
said step of sending said first message includes sending said first message from a site outside of the vehicle and said first disparate subsystem utilizes TCP/IP in communicating over the Internet using wireless technology located in the vehicle.

3. A method, as claimed in claim 1, wherein:
said first message relates to a configuration packet including packet information related to a destination of said configuration packet from a source, a service related to said second disparate subsystem and said first information relates to data being obtained from said second disparate subsystem.

4. A method, as claimed in claim 1, further including:
receiving at least portions of said first request by said flow manager for managing performance of a first function related to said first information.

5. A method, as claimed in claim 4, wherein:
said managing performance step includes generating a child process that is involved with one of the following: encryption of said first information by said encryption manager and compression of said first information by said compression manager.

6. A method, as claimed in claim 3, further including:
receiving by said security manager said configuration packet and said security manager for use in determining access availability of the source associated with said configuration packet.

7. A method, as claimed in claim 1, wherein:
said step of receiving said first request includes checking for a request for service related to at least one of the following: encryption of information using said encryption manager, compression of information using said compression manager, and access to said communications apparatus related to said first message using said security manager.

8. A method, as claimed in claim 7, wherein:
said checking step includes reading a configuration packet associated with said first message.

9. A method, as claimed in claim 1, further including:
producing a child process by said flow manager related to one of: encrypting said first information using said encryption manager and compressing said first information using said compression manager.

10. A method, as claimed in claim 1, wherein:
said producing step includes providing a metachild process that is involved in obtaining said first information from said second disparate subsystem and also obtaining second information from a fifth disparate subsystem.

11. A method, as claimed in claim 10, wherein:
said step of providing said metachild process includes creating said metachild process using said flow manager of said communications apparatus.

12. A method, as claimed in claim 1, further including:
creating a first child process that is part of a communications connection related to receiving said first information using said second disparate subsystem manager;
producing a second child process; and
registering said first and second child processes using abase manager and de-registering said first and second child processes.

13. A method, as claimed in claim 1, further including:
registering said first and second disparate subsystems before said step of sending said first message.

14. A method for providing information among a plurality of disparate subsystems using a plurality of managers and a common module, comprising:
registering at least first, second and third disparate subsystem managers using a base manager of said common module, said first disparate subsystem manager being in communication with a first disparate subsystem, said second disparate subsystem manager being in communication with a second disparate subsystem and said third disparate subsystem manager being in communication with a third disparate subsystem, said first, second and third disparate subsystems include: a wireless communications device, transmission control protocol/Internet protocol (TCP/IP) and one of the following: a security manager that monitors external applications attempting to connect to at least one of said first, second and third disparate subsystem managers, a flow manager that enables communications involving at least one of said disparate subsystem managers, and a configuration manager that performs configuration tasks;
obtaining first information from said first disparate subsystem using said first disparate subsystem manager, said obtaining step includes creating a first child component process using at least said second disparate subsystem manager and registering said first child component process using said base manager;
sending said first information from said first disparate subsystem;
transmitting second information using said third disparate subsystem manager to an external application; and
creating a second child component process and registering said second child component process using said base manager;
wherein each of said registering steps includes associating an identifier with each of said first, second and third disparate subsystem managers and associating an identifier with each of said first and second child component processes.

15. A method, as claimed in claim 14, wherein:
said obtaining step includes requesting said first information from said first disparate subsystem using a first common communications protocol associated with said common module.

16. A method, as claimed in claim 14, wherein:
said sending step includes sending said first information continuously using a stream application programming interface (API) substantially independent of request and response messaging.

17. A method, as claimed in claim 14, wherein:
said second information includes said first information.

18. A method, as claimed in claim 14, further including:
gathering information by a portal apparatus from a number of vehicles associated with a fleet of vehicles operated by a first entity, each of said number of vehicles having a communications apparatus and said portal apparatus communicating with each said communications apparatus using a first communications network and said portal apparatus being located remotely from each of said number of vehicles.

19. A method, as claimed in claim 14, wherein:
said second child component process is related to said second information.

20. A system for providing communications in a vehicle, comprising:
a plurality of disparate subsystems located in the vehicle and including a protocol stack, a global positioning system (GPS), voice recognition (VR) and at least one of: an intelligent transport system data bus (IDB) and a controller area network (CAN); and
a communications apparatus operatively connected to each of said disparate subsystems that enables communications between them, said communications apparatus including:
at least four disparate subsystem managers and each of said disparate subsystems being dedicated to one of said at least four disparate subsystem managers, wherein each of said disparate subsystems communicates with its dedicated disparate subsystem manager and any communication involving a particular one of said disparate subsystems requires communication with said disparate subsystem manager to which said particular one disparate subsystem is dedicated, at least some of said disparate subsystem managers provide messages to others of said disparate subsystem managers, respond to messages from others of said disparate subsystem managers and create connections with others of said disparate subsystem managers; and
at least four common module managers, wherein each of said at least four disparate subsystem managers uses a common communications protocol when communicating with each of said at least four common module managers and each of said disparate subsystems communicates with its dedicated disparate subsystem manager using a native interface that is different from native interfaces of the others of said at least four disparate subsystem managers, and in which each of said at least four disparate subsystem managers, each of said disparate subsystems and each of said at least four common module managers is located with the vehicle.

21. A system, as claimed in claim 20, wherein:
said disparate subsystems further include a plurality of the following: an analog-to-digital converter in communication with at least one hardware device, a standard serial bus in communication with a plurality of devices located in the vehicle and a universal serial bus (USB) in communication with computer hardware.

22. A system, as claimed in claim 20, wherein:
said at least four common module managers are part of a common module, including a processor core, that is involved with registering components, including said at least four disparate subsystem managers.

23. A system, as claimed in claim 20, wherein:
said common communications protocol includes at least one of the following: a stream mode of operation in which a stream applications programming interface (API) is used to send data continuously and a request/response mode of operation using a bus applications programming interface (API) in which information is transmitted by responding to a request from at least one of said disparate subsystem managers.

24. A system, as claimed in claim 20, wherein:

said communications apparatus includes a bridge mode of operation in which control of information transfer resides substantially externally of the vehicle and an application mode of operation in which control of information transfer resides substantially within the vehicle.

25. A system, as claimed in claim 20, wherein:

said at least four disparate subsystem managers includes a first disparate subsystem manager and a second disparate subsystem manager and in which a first child component process is created using at least one of said first and second disparate subsystem managers to establish a connection between them.

26. A system, as claimed in claim 20, wherein:

said at least four common module managers include four of the following: a base manager used in registering said disparate subsystems, said at least four disparate subsystem managers and said a least four common module managers, a security manager for monitoring external applications attempting to connect to said communications apparatus, a link selection manager for providing an acceptable network link for transmitting and/or receiving information wirelessly relative to the vehicle, a flow manager for enabling communications involving three of said at least four disparate subsystem managers, a compression manager for compressing data for transfer, and an encryption manager for encrypting data before transfer.

27. A system, as claimed in claim 20, further including:

a portal apparatus located remotely from the vehicle and in communication with said communications apparatus using wireless technology.

28. A method for communicating with a number of vehicles, comprising:

providing a plurality of communications apparatuses including a first communication apparatus and a second communications apparatus, each of the number of vehicles having a different one of said plurality of communications apparatuses;

providing at least a first fleet management subsystem that manages at least a plurality of the number of vehicles in the fleet;

providing a portal apparatus located remotely from each of said fleet management subsystem and each of said plurality of communications apparatuses;

providing a first communications network by which said portal apparatus communicates with each of said plurality of communications apparatuses and a second communications network by which said portal apparatus communicates with said fleet management subsystem;

maintaining information by said portal apparatus related to an identity of software being used by each of said communications apparatuses and in which said identity of software for said first communications apparatus is different from said identity of software for said second communications apparatus;

updating software in each of said plurality of communications apparatuses by said portal apparatus;

obtaining vehicle operational data from each of said plurality of communications apparatuses by said portal apparatus;

storing said vehicle operational data in memory of said portal apparatus;

gathering diagnostic data from each of said communications apparatuses by said portal apparatus;

storing said diagnostic data in said memory of said portal apparatus;

notifying said first fleet management subsystem by said portal apparatus of said identity of software being used by at least said first and second communications apparatuses; and sending at least some of said vehicle operational data and said diagnostic data to said first fleet management subsystem by said portal apparatus.

29. A method, as claimed in claim 28, wherein:

at least said first communications network includes the Internet.

30. A method, as claimed in claim 28, further including:

providing a number of fleet management subsystems including said at least first fleet management subsystem and in which said at least first fleet management subsystem is notified related to said software being used by less than all of said plurality of communications apparatuses.

* * * * *